United States Patent [19]
Amemiya

[11] Patent Number: 5,886,826
[45] Date of Patent: Mar. 23, 1999

[54] MICROSCOPE OBJECTIVE

[75] Inventor: Noboru Amemiya, Chigasaki, Japan

[73] Assignee: Nikon Corporation, Tokyo, Japan

[21] Appl. No.: 815,161

[22] Filed: Mar. 11, 1997

[30] Foreign Application Priority Data

Mar. 13, 1996 [JP] Japan .................................. 8-084635

[51] Int. Cl.$^6$ .................................................. G02B 21/02
[52] U.S. Cl. .......................... 359/656; 359/657; 359/658; 359/659; 359/660; 359/661
[58] Field of Search .................................. 359/656, 657, 359/658, 659, 660, 661

[56] References Cited

U.S. PATENT DOCUMENTS 5,469,299  11/1995  Nagano .................................. 359/661

FOREIGN PATENT DOCUMENTS 5-072482  3/1993  Japan .

*Primary Examiner*—Georgia Epps
*Assistant Examiner*—Michael A. Lucas
*Attorney, Agent, or Firm*—Morgan, Lewis & Bockius LLP

[57] ABSTRACT

Provided is a microscope objective including a plurality of meniscus lenses disposed along a predetermined optical axis; a plurality of first doublets aligned along the optical axis and disposed behind the plurality of meniscus lenses; and a plurality of second doublets aligned along the optical axis and disposed behind the plurality of first doublets, wherein a distance between a rearmost one of the first doublets and a front one of the second doublets is larger than a distance between any two adjacent ones of the first doublets and a distance between any two adjacent ones of the second doublets.

20 Claims, 5 Drawing Sheets

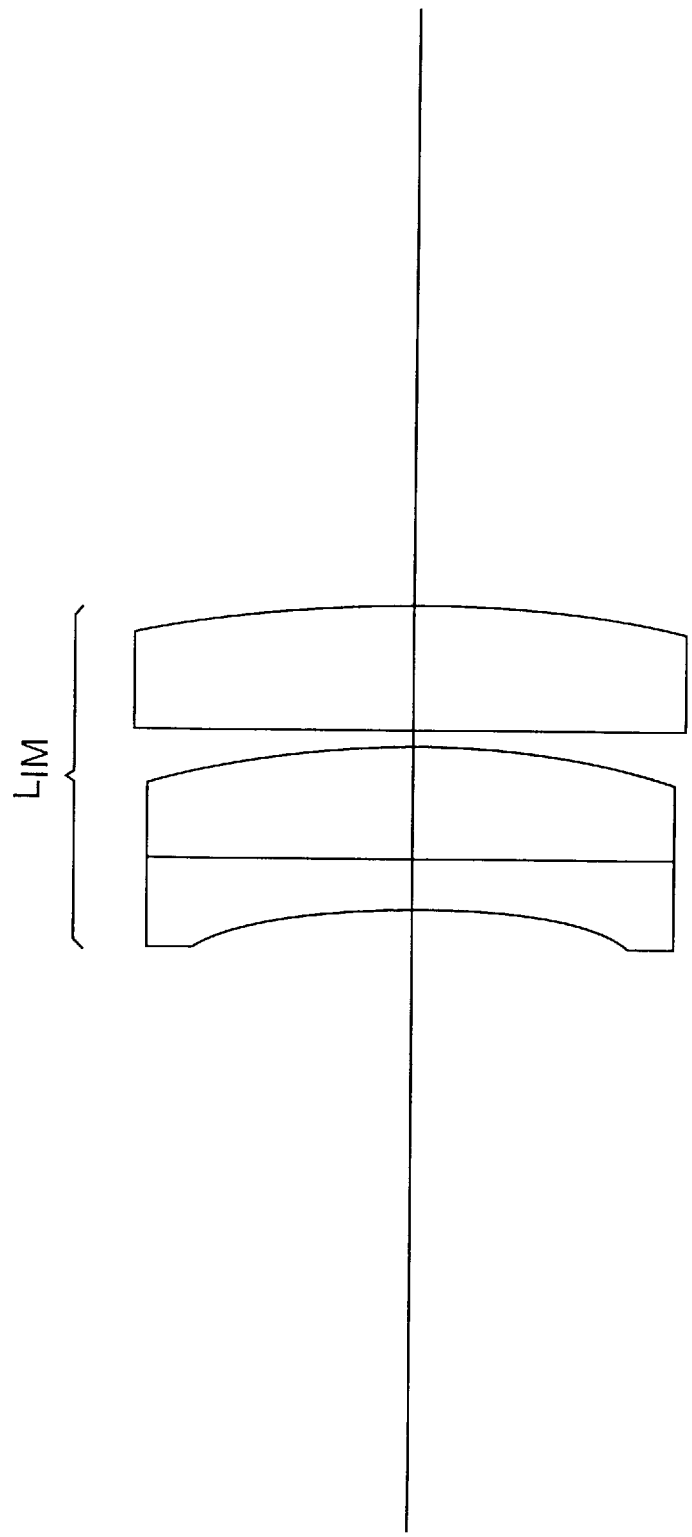

MICROSCOPE OBJECTIVE

BACKGROUND OF THE INVENTION

1. Field of the Invention

The present invention relates to a microscope objective, and more particularly, to a microscope objective suitable for ultra-violet radiation with a wavelength of about 250 nm.

2. Discussion of the Related Art

One example of microscope objective usable for ultra-violet radiation of about 250 nm wavelength is disclosed in Japanese Laid-Open Patent Publication 5-72482. This objective is composed of a first lens group including meniscus lenses and concave-convex cemented lenses (achromatic doublet or the like), a second lens group containing at least two three-piece cemented lenses (lens triplet or the like), and a third lens group containing concave-convex cemented lenses.

Fluorite ($CaF_2$), quartz, and "Ultran 30" (Trademark of Schott Co.) are optical materials that are considered to have sufficient transmission rates in the neighborhood of the 250 nm wavelength. However, since these optical materials do not have large differences in the Abbe number, the conventional microscope objective must use many three-piece cemented lenses (lens triplet) to achieve achromatism.

At present, only silicon type adhesives are available as the adhesive that has a sufficient transmission rate in the neighborhood of 250 nm wavelength. However, the bonding power of the silicon type adhesive is weak, and thus, it is difficult to produce a highly precise three-piece cemented lens. Therefore, even though such a lens may be designed, the actual production is extremely difficult.

SUMMARY OF THE INVENTION

Accordingly, the present invention is directed to a microscope objective that substantially obviates one or more of the problems due to limitations and disadvantages of the related art.

An object of the present invention is to provide a microscope objective usable in the ultra-violet range without using a three-piece cemented lens.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention provides a microscope objective including a plurality of meniscus lenses disposed along a predetermined optical axis; a plurality of first doublets aligned along the optical axis and disposed behind the plurality of meniscus lenses; and a plurality of second doublets aligned along the optical axis and disposed behind the plurality of first doublets, wherein a distance between a rearmost one of the first doublets and a front one of the second doublets is larger than a distance between any two adjacent ones of the first doublets and a distance between any two adjacent ones of the second doublets.

In another aspect, the present invention provides a microscope objective including two meniscus lenses disposed along an optical axis adjacent the object, the two meniscus lenses each having concave surfaces on front sides; seven first doublets aligned along the optical axis and disposed behind the meniscus lenses, wherein each of the seven first doublets includes a positive lens and a negative lens aligned along the optical axis; and two second doublets aligned along the optical axis and disposed behind the first doublets, wherein each of the two second doublets includes a positive lens and a negative lens aligned along the optical axis, wherein in each of four front ones of the first doublets, the negative lens is located on the front side, and in each of three rear first doublets, the positive lens is located on the front side, and wherein in a front one of the second doublets, the positive lens is located on the front side, and in a rear one of the second doublets, the negative lens is located on the front side.

In another aspect, the present invention provides a microscope objective including two meniscus lenses disposed along an optical axis adjacent the object, the two meniscus lenses each having concave surfaces on front sides; seven first doublets aligned along the optical axis and disposed behind the meniscus lenses, wherein each of the seven first doublets includes a positive lens and a negative lens aligned along the optical axis; and two second doublets aligned along the optical axis and disposed behind the first doublets, wherein each of the two second doublets includes a positive lens and a negative lens aligned along the optical axis, wherein in each of four front ones of the first doublets, the negative lens is located on the front side, and in each of three rear first doublets, the positive lens is located on the front side, wherein in a front one of the second doublets, the positive lens is located on the front side, and in a rear one of the second doublets, the negative lens is located on the front side, and wherein a distance between a rearmost one of the first doublets and a front one of the second doublets is larger than a distance between any two adjacent ones of the first doublets and a distance between any two adjacent ones of the second doublets.

In another aspect, the present invention provides a microscope objective including, in the following order from an object side, a front lens group; and a rear lens group aligned with the front lens group, wherein the front lens group includes two meniscus lenses having concave surfaces facing the object side, and seven doublets, each of the seven doublets being formed by cementing a positive lens and a negative lens, and the rear lens group includes two doublets, each of the two doublets being formed by cementing a positive lens and a negative lens.

In a further aspect, the present invention provides a microscope objective including, in the following order from the object side, a front lens group and a rear lens group, wherein the front lens group contains two meniscus lenses having concave surfaces facing the object side, and seven doublets, each of which is formed by cementing a positive lens and a negative lens, and the rear lens group contains two doublets which are formed by cementing a positive lens and a negative lens.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 5 is a cross-sectional view of an imaging lens.

DETAILED DESCRIPTION OF THE PREFERRED EMBODIMENTS

Reference will now be made in detail to the preferred embodiments of the present invention, examples of which are illustrated in the accompanying drawings.

Figure 1:
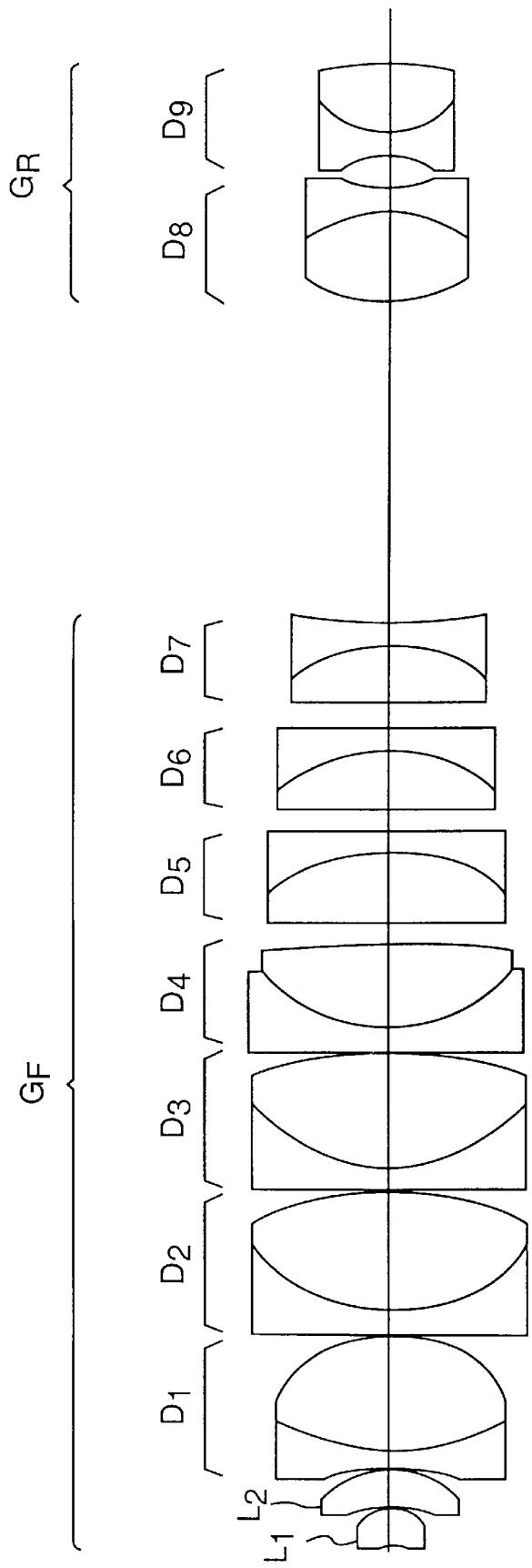
FIG. 1 is a cross-sectional view of a microscope objective according to a first preferred embodiment.
Figure 3:
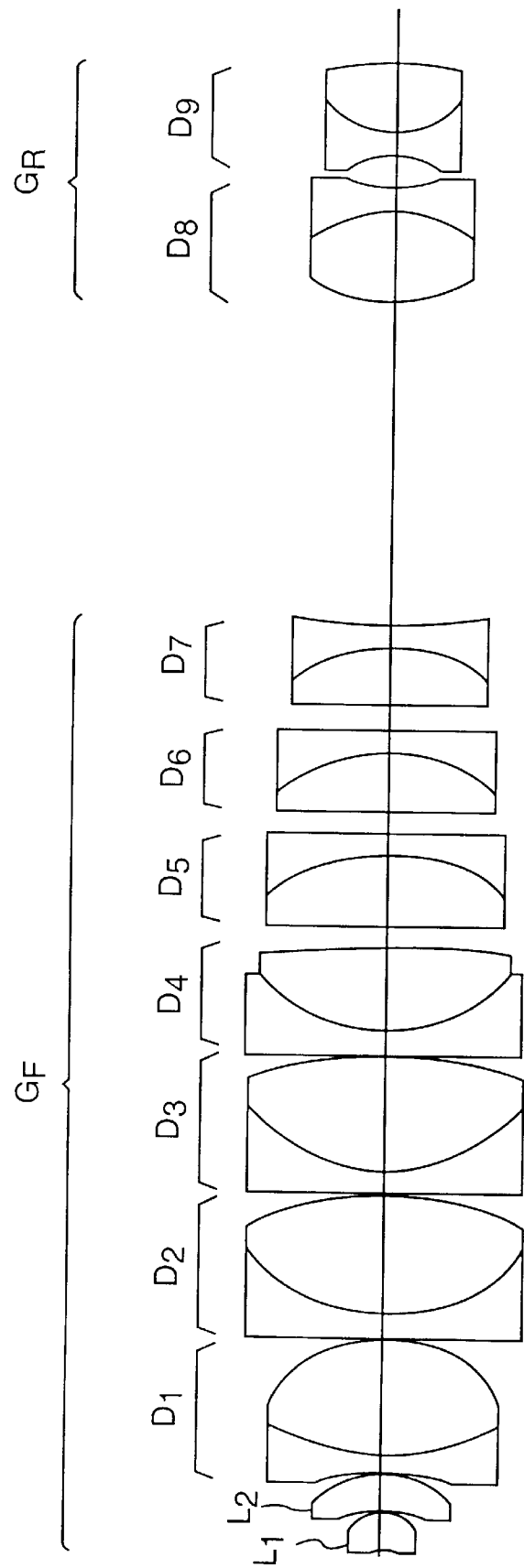
FIG. 3 is a cross-sectional view of a microscope objective according to a second preferred embodiments.

FIGS. 1 and 3 illustrate the first and second preferred embodiments according to the present invention, respectively. The objectives of these embodiments each have a front lens group $G_F$ on the object side and a rear lens group $G_R$ on the other side. From the object side, the front lens group $G_F$ includes two meniscus lenses $L_1$ and $L_2$, each having its concave surface facing toward the object. After the two meniscus lenses and seven doublets $D_1$ to $D_7$, each of which is formed by cementing a positive lens and a negative lens. The rear lens group $G_R$ includes two doublets $D_8$, $D_9$, formed by cementing a positive lens and a negative lens.

The dimensions and composition of the first and second embodiments are listed in Table 1 and Table 2, respectively. At the top of each Table, f represents the focal length, $D_0$ represents the object point distance, and N.A. represents the numerical aperture of the objective as a whole. In each Table, the first column represents the number of lens surfaces from the object side, the second column r represents the radius of curvature of each lens surface, the third column d represents the distance between two adjacent lens surfaces, and the fourth column shows the material of each lens. The fifth, sixth, and seventh columns represent indices of refraction, $n_{246}$, $n_{242}$, and $n_{250}$ for the wavelengths $\lambda=246$ nm, 242 nm, and 250 nm, respectively, for each lens. The eighth column v represents the Abbe number based on indices of refraction for these lenses at a wavelength centered at $\lambda=246$ nm. The material U30 denotes "Ultran 30".

TABLE 1 f = 2.0 $D_0$ = 0.34 N.A. = 0.900

| | r | d | Material | $n_{246}$ | $n_{242}$ | $n_{250}$ | v |
|---|---|---|---|---|---|---|---|
| 1 | -1.68 | 1.64 | quartz | 1.50952 | 1.51189 | 1.50729 | 110.8 |
| 2 | -1.59 | 0.05 | | | | | |
| 3 | -5.28 | 1.60 | fluorite | 1.46863 | 1.47021 | 1.46714 | 153.1 |
| 4 | -3.82 | 0.05 | | | | | |
| 5 | -11.04 | 0.80 | quartz | 1.50952 | 1.51189 | 1.50729 | 110.8 |
| 6 | 10.23 | 5.00 | fluorite | 1.46863 | 1.47021 | 1.46714 | 153.1 |
| 7 | -5.77 | 0.10 | | | | | |
| 8 | 300.00 | 1.00 | quartz | 1.50952 | 1.51189 | 1.50729 | 110.8 |
| 9 | 7.86 | 5.00 | fluorite | 1.46863 | 1.47021 | 1.46714 | 153.1 |
| 10 | -14.32 | 0.10 | | | | | |
| 11 | 90.00 | 1.00 | quartz | 1.50952 | 1.51189 | 1.50729 | 110.8 |
| 12 | 7.72 | 5.00 | fluorite | 1.46863 | 1.47021 | 1.46714 | 153.1 |
| 13 | -18.00 | 0.10 | | | | | |
| 14 | 250.00 | 1.00 | quartz | 1.50952 | 1.51189 | 1.50729 | 110.8 |
| 15 | 7.51 | 3.50 | fluorite | 1.46863 | 1.47021 | 1.46714 | 153.1 |
| 16 | -45.09 | 1.00 | | | | | |
| 17 | 200.00 | 3.00 | fluorite | 1.46863 | 1.47021 | 1.46714 | 153.1 |
| 18 | -8.59 | 1.00 | quartz | 1.50952 | 1.51189 | 1.50729 | 110.8 |
| 19 | -216.34 | 1.00 | | | | | |
| 20 | 200.00 | 2.50 | fluorite | 1.46863 | 1.47021 | 1.46714 | 153.1 |
| 21 | -7.87 | 1.00 | quartz | 1.50952 | 1.51189 | 1.50729 | 110.8 |
| 22 | -1680.00 | 1.00 | | | | | |
| 23 | 200.00 | 2.50 | fluorite | 1.46863 | 1.47021 | 1.46714 | 153.1 |
| 24 | -6.85 | 1.00 | quartz | 1.50952 | 1.51189 | 1.50729 | 110.8 |
| 25 | 26.08 | 14.00 | | | | | |
| 26 | 6.32 | 4.00 | quartz | 1.50952 | 1.51189 | 1.50729 | 110.8 |
| 27 | -6.00 | 1.00 | fluorite | 1.46863 | 1.47021 | 1.46714 | 153.1 |
| 28 | 5.15 | 1.50 | | | | | |
| 29 | -3.66 | 1.00 | fluorite | 1.46863 | 1.47021 | 1.46714 | 153.1 |
| 30 | 3.99 | 3.00 | quartz | 1.50952 | 1.51189 | 1.50729 | 110.8 |
| 31 | -13.00 | | | | | | |

TABLE 2 f = 2.0 $D_0$ = 0.34 N.A. = 0.900

| | r | d | Material | $n_{246}$ | $n_{242}$ | $n_{250}$ | v |
|---|---|---|---|---|---|---|---|
| 1 | -1.72 | 1.64 | U30 | 1.60649 | 1.60929 | 1.60387 | 112.1 |
| 2 | -1.66 | 0.05 | | | | | |
| 3 | -5.08 | 1.60 | fluorite | 1.46863 | 1.47021 | 1.46714 | 153.1 |
| 4 | -3.95 | 0.05 | | | | | |
| 5 | -9.95 | 0.80 | quartz | 1.50952 | 1.51189 | 1.50729 | 110.8 |
| 6 | 9.73 | 5.00 | fluorite | 1.46863 | 1.47021 | 1.46714 | 153.1 |
| 7 | -5.66 | 0.10 | | | | | |
| 8 | 300.00 | 1.00 | quartz | 1.50952 | 1.51189 | 1.50729 | 110.8 |
| 9 | 7.54 | 5.00 | fluorite | 1.46863 | 1.47021 | 1.46714 | 153.1 |
| 10 | -14.27 | 0.10 | | | | | |
| 11 | 90.00 | 1.00 | quartz | 1.50952 | 1.51189 | 1.50729 | 110.8 |
| 12 | 7.49 | 5.00 | fluorite | 1.46863 | 1.47021 | 1.46714 | 153.1 |
| 13 | -18.00 | 0.10 | | | | | |
| 14 | 250.00 | 1.00 | quartz | 1.50952 | 1.51189 | 1.50729 | 110.8 |
| 15 | 7.78 | 3.50 | fluorite | 1.46863 | 1.47021 | 1.46714 | 153.1 |
| 16 | -48.96 | 1.00 | | | | | |
| 17 | 200.00 | 3.00 | fluorite | 1.46863 | 1.47021 | 1.46714 | 153.1 |
| 18 | -8.91 | 1.00 | quartz | 1.50952 | 1.51189 | 1.50729 | 110.8 |
| 19 | -127.26 | 1.00 | | | | | |
| 20 | 200.00 | 2.50 | fluorite | 1.46863 | 1.47021 | 1.46714 | 153.1 |
| 21 | -8.00 | 1.00 | quartz | 1.50952 | 1.51189 | 1.50729 | 110.8 |
| 22 | -1220.00 | 1.00 | | | | | |
| 23 | 200.00 | 2.50 | fluorite | 1.46863 | 1.47021 | 1.46714 | 153.1 |
| 24 | -6.81 | 1.00 | quartz | 1.50952 | 1.51189 | 1.50729 | 110.8 |
| 25 | 23.91 | 14.00 | | | | | |
| 26 | 6.18 | 4.00 | quartz | 1.50952 | 1.51189 | 1.50729 | 110.8 |
| 27 | -6.00 | 1.00 | fluorite | 1.46863 | 1.47021 | 1.46714 | 153.1 |
| 28 | 5.22 | 1.50 | | | | | |
| 29 | -3.60 | 1.00 | fluorite | 1.46863 | 1.47021 | 1.46714 | 153.1 |
| 30 | 3.91 | 3.00 | quartz | 1.50952 | 1.51189 | 1.50729 | 110.8 |
| 31 | -13.00 | | | | | | |

As shown in Tables 1 and 2, in both embodiments, a distance between a rearmost one of the first doublets and a front one of the second doublets (see the 25th row in the tables) is larger than a distance between any two adjacent ones of the first doublets and a distance between any two adjacent ones of the second doublets.

Figure 2:
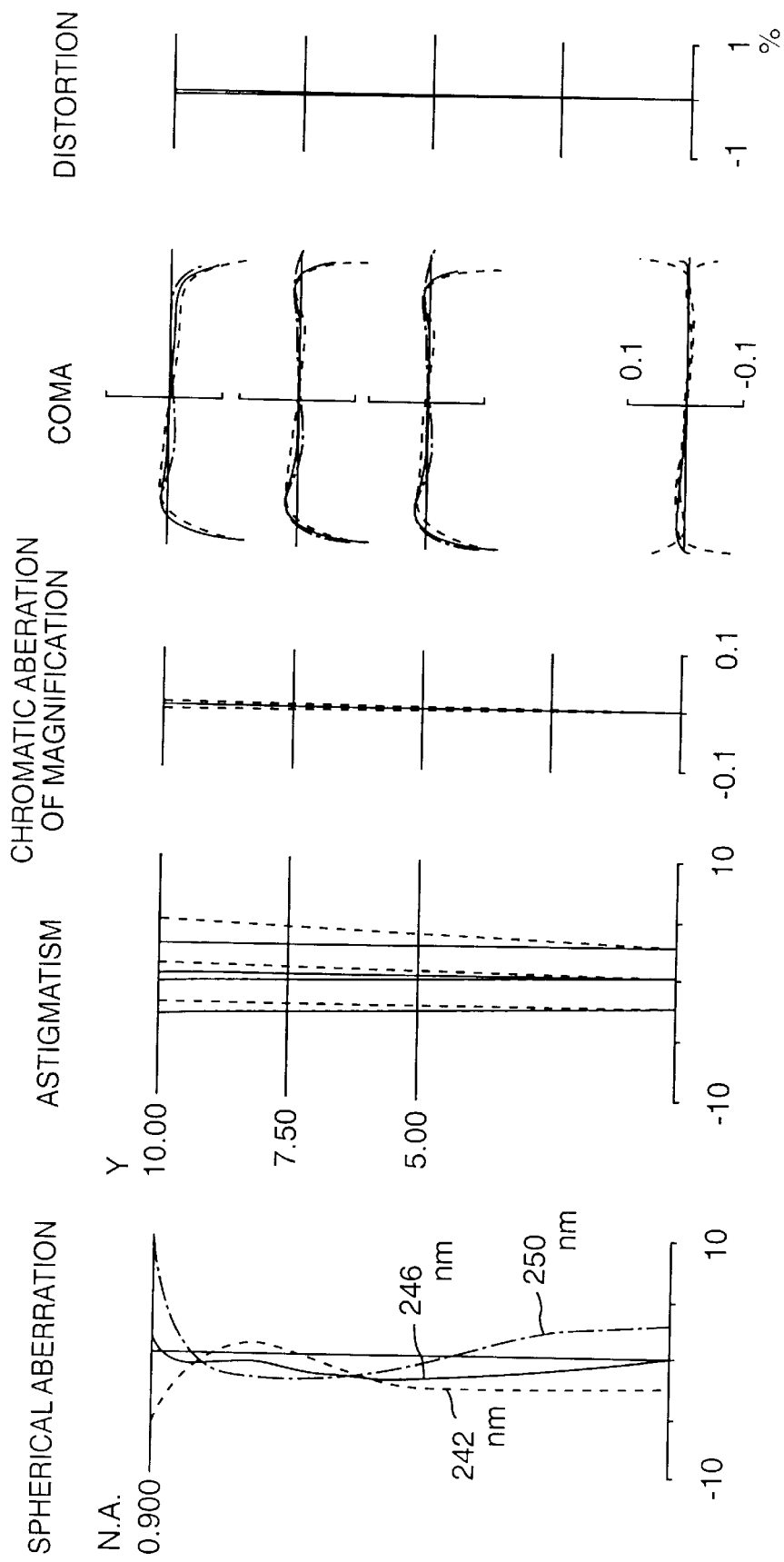
FIG. 2 is various aberration diagrams of a microscope objective according to the first preferred embodiment.
Figure 4:
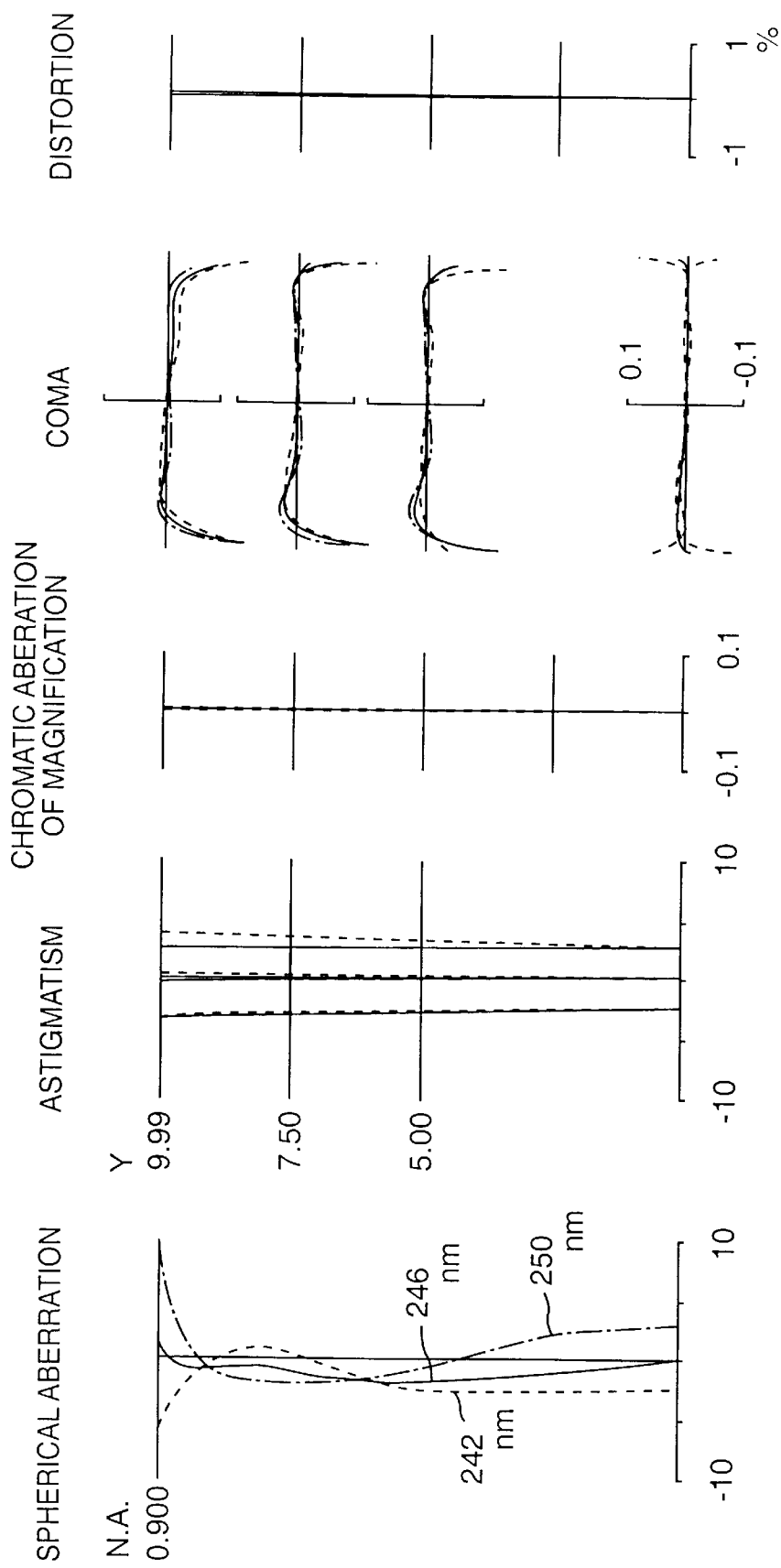
FIG. 4 is various aberration diagrams of a microscope objective according to the second embodiment.

FIGS. 2 and 4 each show the spherical aberration, astigmatism, chromatic aberration of magnification, coma, and distortion of the objectives of the first and second embodiments, respectively. In the diagrams for the spherical aberration, chromatic aberration of magnification, and coma, solid lines represent wavelength $\lambda=246$ nm; dotted lines represent wavelength $\lambda=242$ nm; and one-dot-chain lines represent wavelength $\lambda=250$ nm. In the astigmatism diagram, solid lines represents the sagittal image plane and the dotted lines represent the meridional image plane. N.A. represents the numeral aperture and Y represents the image height.

The aberration diagram in both embodiments shown in FIGS. 2 and 4 indicate that the aberrations are favorably corrected at 246±4 nm with the field number (field of view) of 20.

Both the first and second embodiments have been discussed herein with respect to the application of ultra violet radiation. However, the present invention can be applied equally well for visible light.

The objective in each embodiment is of infinite correction type and each aberration diagram above is imaged using an imaging lens $L_{IM}$, as shown in FIG. 5. The dimensions and composition of the imaging lens $L_{IM}$ are listed in Table 3 below.

TABLE 3

| | r | d | Material | $n_{246}$ | $n_{242}$ | $n_{250}$ | v |
|---|---|---|---|---|---|---|---|
| 1 | −30.63 | 2.00 | quartz | 1.50952 | 1.51189 | 1.50729 | 110.8 |
| 2 | 2406.00 | 5.00 | fluorite | 1.46863 | 1.47021 | 1.46714 | 153.1 |
| 3 | −39.10 | 1.00 | | | | | |
| 4 | −417.40 | 5.00 | fluorite | 1.46863 | 1.47021 | 1.46714 | 153.1 |
| 5 | −51.84 | | | | | | |

With the structure described above, a microscope objective with sufficient achromatism may be obtained without using a three-piece cemented lens.

In order to eliminate both the on-axis chromatic aberration and the chromatic aberration of magnification by a single objective, it is preferable to make the seven doublets in the front lens group achromatic and the two doublets in the rear lens group dispersive (generating chromatic abberation on purpose). Hence, for each doublet in the front lens group, the Abbe number of the positive lens is preferably larger than the Abbe number of the negative lens, while for each doublet in the rear lens group, the Abbe number of the positive lens is preferably smaller than the Abbe number of the negative lens.

Moreover, as shown in FIGS. 2 and 4, in order to effectively perform achromatism in the front lens group $G_F$, the cemented surfaces in the four doublets $D_1$ to $D_4$ on the object side are preferably made into convex shapes facing the object, while the cemented surfaces in the three doublets $D_5$ to $D_7$ arranged on the image side are preferably made into concave shapes with respect to the object.

The present invention realizes a microscope objective with favorable achromatism without using a three-piece cemented lens (triplet).

It will be apparent to those skilled in the art that various modifications and variations can be made in the microscope objective of the present invention without departing from the spirit or scope of the invention. Thus, it is intended that the present invention cover the modifications and variations of this invention provided they come within the scope of the appended claims and their equivalents.

What is claimed is:

1. A microscope objective, comprising:

a plurality of meniscus lenses disposed along a predetermined optical axis;

a plurality of first doublets aligned along the optical axis and disposed behind the plurality of meniscus lenses; and a plurality of second doublets aligned along the optical axis and disposed behind the plurality of first doublets, wherein a distance between a rearmost one of the first doublets and a front one of the second doublets is larger than a distance between any two adjacent ones of the first doublets and a distance between any two adjacent ones of the second doublets, wherein each of the plurality of first doublets includes a positive lens and a negative lens, and each of the plurality of second doublets includes a positive lens and a negative lens, wherein an Abbe number of the positive lens is larger than an Abbe number of the negative lens in each of the plurality of first doublets, wherein an Abbe number of the positive lens is smaller than an Abbe number of the negative lens in each of the plurality of second doublets, wherein in each of the plurality of first doublets, an interface is defined between the positive and negative lenses, wherein the interfaces of four front ones of the first doublets are convex as viewed from the front, and wherein the interfaces of three rear ones of the first doublets are concave as viewed from the front.

2. The microscope objective according to claim 1, wherein the plurality of meniscus lenses are two meniscus lenses, the plurality of first doublets are seven doublets, and the plurality of second doublets are two doublets.

3. The microscope objective according to claim 2, wherein in each of the plurality of second doublets, an interface is defined between the positive and negative lenses, wherein the interface of a front one of the second doublets is concave as viewed from the front, and wherein the interface of a rearmost one of the second doublets is convex as viewed from the front.

4. A microscope objective, comprising:

two meniscus lenses disposed along an optical axis adjacent the object, the two meniscus lenses each having concave surfaces on front sides;

seven first doublets aligned along the optical axis and disposed behind the meniscus lenses, wherein each of the seven first doublets includes a positive lens and a negative lens aligned along the optical axis; and two second doublets aligned along the optical axis and disposed behind the first doublets, wherein each of the two second doublets includes a positive lens and a negative lens aligned along the optical axis, wherein in each of four front ones of the first doublets, the negative lens is located on the front side, and in each of three rear first doublets, the positive lens is located on the front side, and wherein in a front one of the second doublets, the positive lens is located on the front side, and in a rear one of the second doublets, the negative lens is located on the front side.

5. The microscope objective according to claim 4, wherein in each of the seven first doublets, an Abbe number of the positive lens with respect to an ultra violet radiation range is larger than an Abbe number of the negative lens with respect to the ultra violet radiation range, and wherein in each of the two second doublets, an Abbe number of the positive lens with respect to the ultra violet radiation range is smaller than an Abbe number of the negative lens with respect to the ultra violet radiation range.

6. The microscope objective according to claim 5, wherein the positive lens of each of the first doublets includes fluorite, and the negative lens of each of the first doublets includes quartz, and wherein the positive lens of each of the second doublets includes quartz, and the negative lens of each of the second doublets includes fluorite.

7. The microscope objective according to claim 6, wherein in each of the seven first doublets, an interface is defined between the positive and negative lenses, wherein the interfaces of four front ones of the first doublets are convex as viewed from the front, and wherein the interfaces of three rear ones of the first doublets are concave as viewed from the front.

8. The microscope objective according to claim 7, wherein in each of the two second doublets, an interface is defined between the positive and negative lenses, wherein the interface of a front one of the second doublets is concave as viewed from the front, and wherein the interface of a rear one of the second doublets is convex as viewed from the front.

9. The microscope objective according to claim 8, wherein a distance between a rearmost one of the first doublets and a front one of the second doublets is larger than a distance between any two adjacent ones of the first doublets and a distance between any two adjacent ones of the second doublets.

10. The microscope objective according to claim 5, wherein the ultra violet radiation range includes a radiation having the wavelength substantially equal to 250 nm.

11. The microscope objective according to claim 4, wherein a distance between a rearmost one of the first doublets and a front one of the second doublets is larger than a distance between any two adjacent ones of the first doublets and a distance between any two adjacent ones of the second doublets.

12. The microscope objective according to claim 4, wherein the seven first doublets are adapted to be achromatic as a whole;

the two second doublets are adapted to be dispersive as a whole; and the two meniscus lenses, the seven first doublets, and the two second doublets are adapted to be achromatic as a whole.

13. A microscope objective, comprising:

two meniscus lenses disposed along an optical axis adjacent the object, the two meniscus lenses each having concave surfaces on front sides;

seven first doublets aligned along the optical axis and disposed behind the meniscus lenses, wherein each of the seven first doublets includes a positive lens and a negative lens aligned along the optical axis; and two second doublets aligned along the optical axis and disposed behind the first doublets, wherein each of the two second doublets includes a positive lens and a negative lens aligned along the optical axis, wherein in each of four front ones of the first doublets, the negative lens is located on the front side, and in each of three rear first doublets, the positive lens is located on the front side, wherein in a front one of the second doublets, the positive lens is located on the front side, and in the rear one of the second doublets, the negative lens is located on the front side, wherein a distance between a rearmost one of the first doublets and a front one of the second doublets is larger than a distance between any two adjacent ones of the first doublets and a distance between any two adjacent ones of the second doublets.

14. The microscope objective according to claim 13, wherein in each of the seven first doublets, an Abbe number of the positive lens with respect to an ultra violet radiation range is larger than an Abbe number of the negative lens with respect to the ultra violet radiation range, and wherein in each of the two second doublets, an Abbe number of the positive lens with respect to the ultra violet radiation range is smaller than an Abbe number of the negative lens with respect to the ultra violet radiation range.

15. The microscope objective according to claim 14, wherein the positive lens of each of the first doublets includes fluorite, and the negative lens of each of the first doublets includes quartz, and wherein the positive lens of each of the second doublets includes quartz, and the negative lens of each of the second doublets includes fluorite.

16. The microscope objective according to claim 15, wherein in each of the seven first doublets, an interface is defined between the positive and negative lenses, wherein the interfaces of four front ones of the first doublets are convex as viewed from the front, and wherein the interfaces of three rear ones of the first doublets are concave as viewed from the front.

17. The microscope objective according to claim 16, wherein in each of the two second doublets, an interface is defined between the positive and negative lenses, wherein the interface of a front one of the second doublets is concave as viewed from the front, and wherein the interface of a rear one of the second doublets is convex as viewed from the front.

18. The microscope objective according to claim 14, wherein the ultra violet radiation range includes a radiation having the wavelength substantially equal to 250 nm.

19. The microscope objective according to claim 13, wherein the seven first doublets are adapted to be achromatic as a whole;

the two second doublets are adapted to be dispersive as a whole; and the two meniscus lenses, the seven first doublets, and the two second doublets are adapted to be achromatic as a whole.

20. A microscope objective, comprising, in the following order from an object side, a front lens group; and a rear lens group aligned with the front lens group, wherein the front lens group includes two meniscus lenses having concave surfaces facing the object side, and seven doublets, each of the seven doublets being formed by cementing a positive lens and a negative lens, and the rear lens group includes two doublets, each of the two doublets being formed by cementing a positive lens and a negative lens.

* * * * *